(No Model.)
E. C. ATKINS.
CROSSCUT SAW.
No. 413,012.
Patented Oct. 15, 1889.
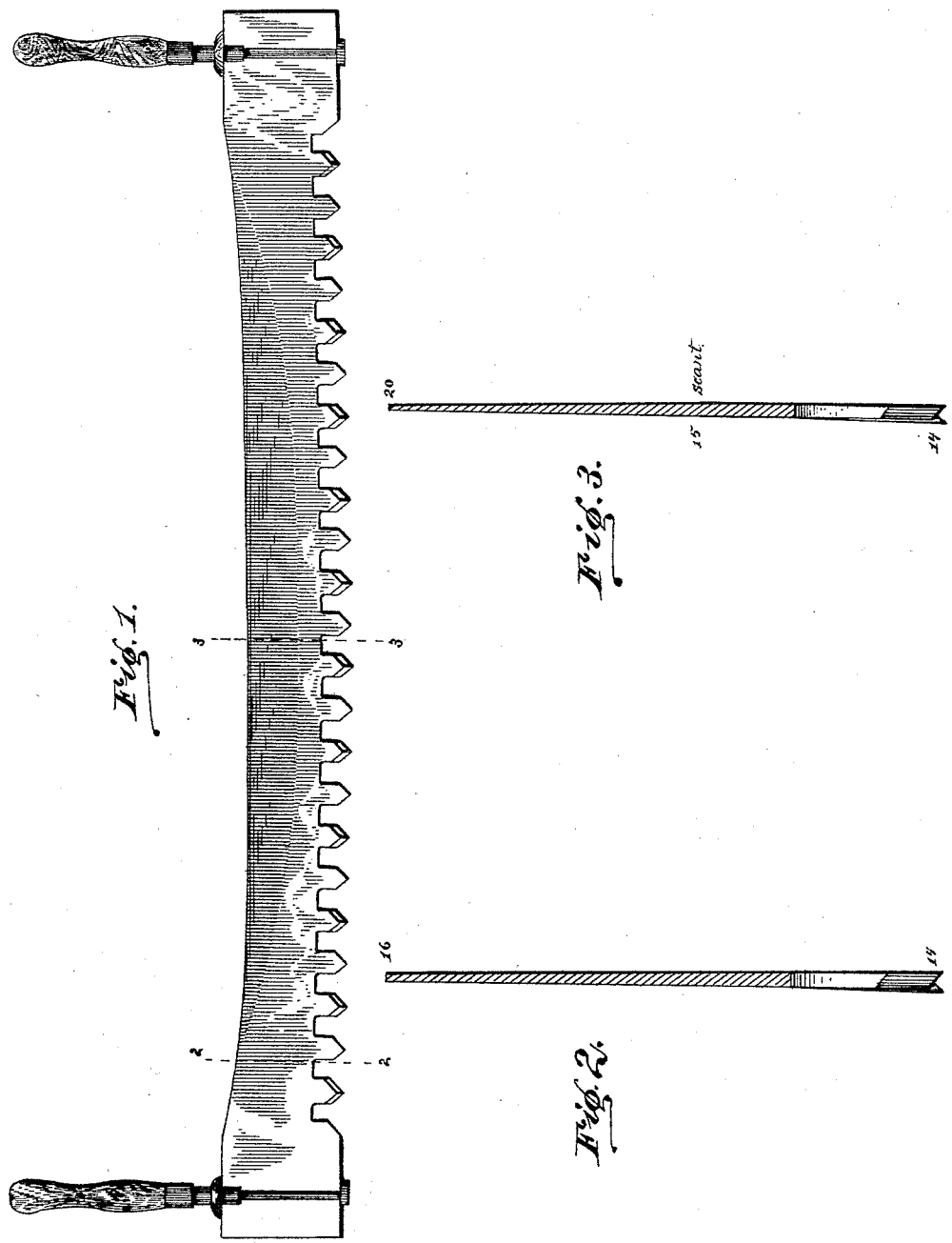
WITNESSES.
C. W. H. Brown,
W. A. Barton
INVENTOR.
Elias C. Atkins,
E. W. Bradford
ATTORNEYS.

UNITED STATES PATENT OFFICE.

ELIAS C. ATKINS, OF INDIANAPOLIS, INDIANA.

CROSSCUT-SAW.

SPECIFICATION forming part of Letters Patent No. 413,012, dated October 15, 1889.

Application filed February 8, 1889. Serial No. 299,126. (No model.)

*To all whom it may concern:*

Be it known that I, ELIAS C. ATKINS, a citizen of the United States, residing at Indianapolis, in the county of Marion and State of Indiana, have invented certain new and useful Improvements in Crosscut-Saws, of which the following is a specification.

As is well known to those familiar with the art, in the use of crosscut-saws the greatest strength is required at a point near each end, while the portion which ordinarily binds in the wood is at the center and for a short distance each side thereof. It is also a fact that in use the portion of the saw near each end does not ordinarily enter the wood.

The object of my said invention is, therefore, to provide a crosscut-saw of such a form as to possess the necessary strength at the desired point, but so reduced in thickness where strength is not required as to obviate the usual binding of the saw in the wood and allow a narrow kerf to be cut. I accomplish this object by forming the saw-blade with a hollow back and grinding it first to the thickness desired to give the required strength to the ends of the saw. I then commence at a point just in front of that where it is desired the strength shall be and grind from the back toward the front and center from said point to a point at the same distance from the other end of the saw at a greater angle than that upon which the original grinding was done, thus reducing the thickness of the blade where thickness is not required and permitting the object of my said invention to be accomplished.

Referring to the accompanying drawings, which are made a part hereof, Figure 1 is a side elevation of a saw of the form described; Fig. 2, a section through the same on the dotted line 2 2 in Fig. 1, and Fig. 3 a similar view on the dotted line 3 3 in Fig. 1.

By an examination of Fig. 1 the form of the saw-blade will be clearly understood. At the point indicated by the dotted line 2 2 the saw is ground of a gradually-diminishing thickness from the teeth to the back, the thickness being such as is necessary to give the blade the desired strength at this point—ordinarily fourteen gage on the front edge and sixteen gage on the back, as indicated in Fig. 2. From there toward the center, upon a line curving toward the teeth at the center, to within such a distance as will leave a front edge to the blade of the required strength and stiffness for practical use, it is ground upon an angle of a greater pitch than that to which the ends are ground.

In Fig. 3 the shape of the saw in cross-section at the center is indicated. The front edge is of course of the same thickness throughout its length. A short distance back of the teeth, at fifteen gage, or "fifteen scant," a new angle commences, which continues from said front to the back, which is reduced to twenty gage, or such a gage as will be appropriate in the particular saw being manufactured. By forming the back hollow this large increase in the pitch of the angle on which the grinding of this portion of the saw is done is permitted without reducing the thickness of the back too much for practical use, as will be readily understood. Thus a large quantity of metal which is entirely unnecessary in the use of the saw is taken out of the blade, and the necessity of a set as wide as is usual is obviated, thus reducing the width of the kerf-cut and the strength necessary to run it, and preventing altogether any binding of the saw-blade in the wood.

Having thus fully described my said invention, what I claim as new, and desire to secure by Letters Patent, is—

1. A crosscut-saw formed with a hollow back, the central portion of which is ground thinner on the back than it is at the ends.

2. A crosscut-saw formed with its ends ground of a regularly-diminishing thickness from front to back and from a point near each end, on a line running to near the front edge at the center of the saw, ground thinner than said ends.

3. A crosscut-saw formed with a hollow back and ground from a point near each end, upon a curved line toward the center and front edge of the saw, thinner than the remaining portion.

In witness whereof I have hereunto set my hand and seal, at Indianapolis, Indiana, this 4th day of February, A. D. 1889.

ELIAS C. ATKINS. [L. S.]

Witnesses:
 E. W. BRADFORD,
 W. A. BARTON.